United States Patent [19]
Katoh

[11] Patent Number: 5,335,763
[45] Date of Patent: Aug. 9, 1994

[54] SPRING RETAINER FOR CLUTCH PISTON

[75] Inventor: Tatsuya Katoh, Fuji, Japan

[73] Assignee: Jatco Corporation, Fuji, Japan

[21] Appl. No.: 33,889

[22] Filed: Mar. 18, 1993

[30] Foreign Application Priority Data

Mar. 19, 1992 [JP] Japan .................. 4-92460

[51] Int. Cl.⁵ .................................. F16D 25/06
[52] U.S. Cl. .................. 192/85 AA; 192/70.28;
92/130 B
[58] Field of Search ............ 192/85 AA, 85 A, 70.28;
188/72.3, 72.4, 151 R; 92/130 B

[56] References Cited

U.S. PATENT DOCUMENTS

| | | |
|---|---|---|
| 3,650,364 | 3/1972 | Laing .................. 192/85 AA |
| 3,832,934 | 9/1974 | Dach et al. .......... 192/85 AA X |
| 4,907,684 | 3/1990 | Breisch .............. 192/85 AA X |

FOREIGN PATENT DOCUMENTS

| | | |
|---|---|---|
| 2-129412 | 5/1990 | Japan .................. 192/85 AA |
| 2-128828 | 10/1990 | Japan . |
| WO91/08399 | 6/1991 | World Int. Prop. O. ..... 192/85 AA |

Primary Examiner—Richard M. Lorence
Attorney, Agent, or Firm—Foley & Lardner

[57] ABSTRACT

A spring retainer for a clutch piston has a cylindrical through portion engaged with the shank of a clutch drum and abutting a snap ring at one end. A dish bearing portion is connected to a second end of the through portion and extends in a frusto-conical manner in an axial direction of the shank. In use, the dish bearing portion abuts a dish spring, and a clearance is maintained between the dish bearing portion and the snap ring.

9 Claims, 3 Drawing Sheets

SPRING RETAINER FOR CLUTCH PISTON

BACKGROUND OF THE INVENTION

The present invention relates to a spring retainer for a clutch piston for use in a hydraulic clutch of an automatic transmission.

Referring to FIG. 3, a hydraulic clutch of an automatic transmission includes a clutch drum 2 formed with a ring cylinder 3, and a piston 4 slidably disposed in the cylinder 3 for pressing friction plates 9 splined to the clutch drum 2. A dish spring 6 is arranged for a return operation of the piston 4, and has a position restricted by a spring retainer 7 which is prevented from falling away by a snap spring 8 engaged with a cylindrical shank 5 extending from an inside diameter portion of the cylinder 3. The spring retainer 7 is in the form of a ring having a rectangular section obtained by a machining, and has an end face which abuts on an end face of the snap ring 8 to thereby be prevented from falling away. A constitution of such hydraulic clutch is disclosed, for example, in JP-U 2-128828.

When the dish spring 6 undergoes a force due to a displacement of the piston 4, this force is applied to the snap spring 8 through the spring retainer 7. Referring to FIG. 4, with such prior art constitution for a positional restriction by the spring retainer 7, however, since an inside diameter portion of the snap ring 8 is engaged with a snap ring groove 10 and fails to be movable, only an outside diameter portion thereof is urged to move in the axial direction and tends to trip as indicated by an arrow X. The spring retainer 7 which undergoes a force P also tends to trip in the same direction as that of the snap ring 8, i.e. as indicated by an arrow Y.

As a result, the snap ring 8 also undergoes a force at an outside diameter edge portion 8a thereof, resulting in a further increase in a bending moment. Additionally, if an offset "h" is found between an inside diameter edge of the dish spring 8 and an outside diameter edge of the snap spring 8, tripping is further increased. Thus, an irregular load operates on the snap ring 8 every engagement/disengagement of the clutch, producing a gouge and/or a wear on the snap ring 8 and/or the snap ring groove 10, resulting in an easy omission of the snap ring 8.

Further, since the spring retainer 7 has a simple rectangular section, an inside diameter edge thereof is easy to catch in the snap ring groove 10 or to be fitted therein upon assembling work, resulting in a difficulty in both manual assembling and automation of an assembling process. Furthermore, the spring retainer 7 is formed by a machining, increasing a manufacturing cost.

It is, therefore, an object of the present invention to provide a spring retainer for a clutch piston which is easy to assemble without any possible omission, and low in a manufacturing cost.

SUMMARY OF THE INVENTION

There is provided, according to the present invention, a spring retainer for piston for use in a hydraulic clutch drum which includes a shank formed with a groove, a snap ring engaged with the groove and a dish spring, comprising:

a first portion engaged with the shank, said first portion having one end abutting on the snap ring and another end, said first portion being in the form of a cylinder; and a second portion connected to said another end of said first portion, said second portion extending axially and in the direction of separating from the shank, said second portion abutting on the dish spring, said second portion facing the snap ring with a clearance.

DETAILED DESCRIPTION OF THE INVENTION

Figure 1:
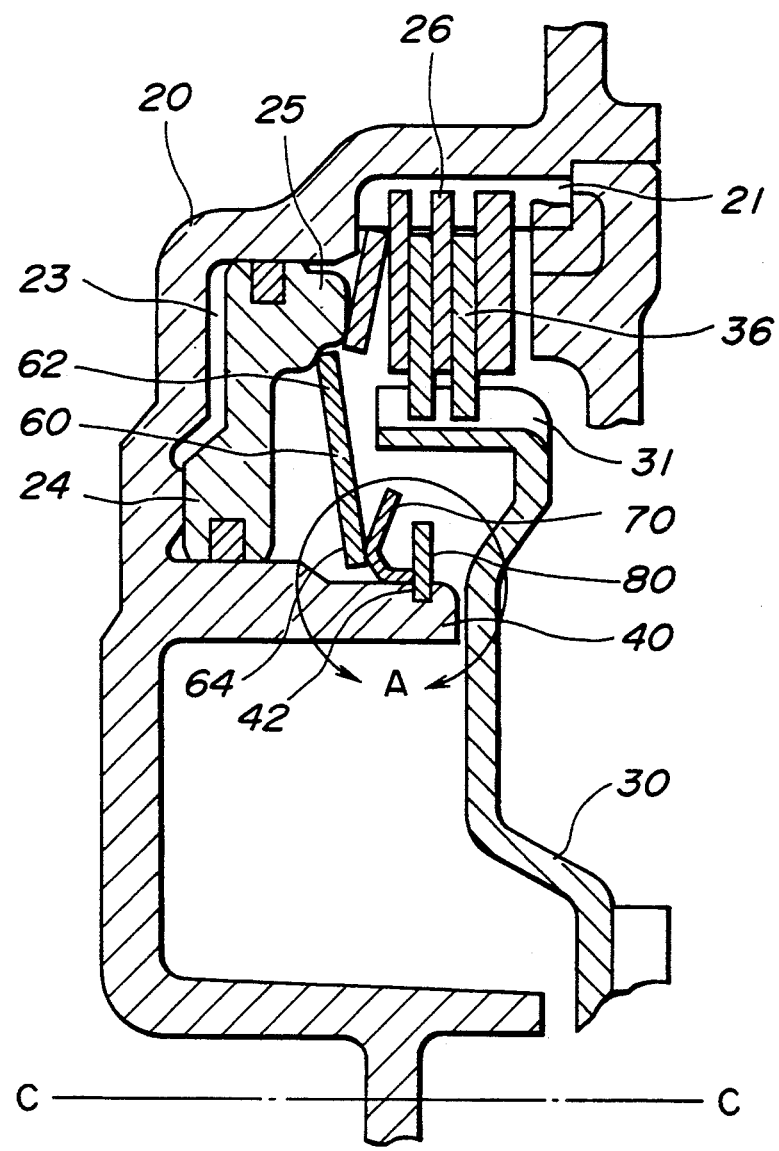
FIG. 1 is a sectional view showing a preferred embodiment of a spring retainer for a clutch piston according to the present invention.

Referring to FIG. 1, a clutch drum 20 with a rotation axis as indicated by a line C—C has a spline 21 at an inner periphery thereof. Arranged alternately are friction members 26 engaged with the spline 21 and friction members 36 engaged with a spline 31 which is arranged to another rotation member 30 at an outer periphery thereof. Formed inside of the clutch drum 20 is a ring cylinder 23 in which a ring clutch piston 24 is slidably disposed. Upon a displacement, the clutch piston 24 presses the friction members 26, 36 through a protrusion 25, engaging a clutch.

The clutch piston 24 is biased by a dish spring 60 in the direction of releasing a press of the friction members 26, 36. The dish spring 60 has an outside diameter edge portion 62 which abuts on the clutch piston 24, and an inside diameter edge portion 64 which abuts on a ring spring retainer 70. The spring retainer 70 is engaged with a cylindrical shank 40 extending from an inside diameter portion of the cylinder 23, and prevented from falling away by a snap ring 80 engaged with a snap ring groove 42 which is also formed on the cylindrical shank 40.

Figure 2:
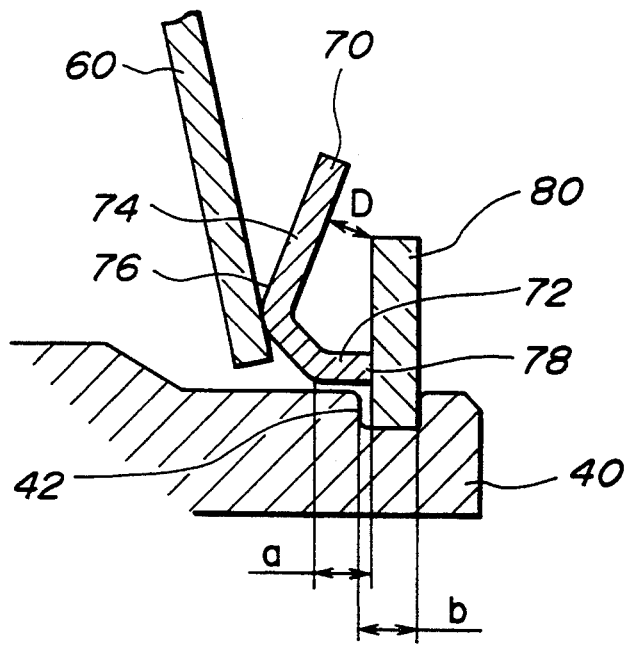
FIG. 2 is an enlarged detail view of a portion A in FIG. 1.
Figure 3:
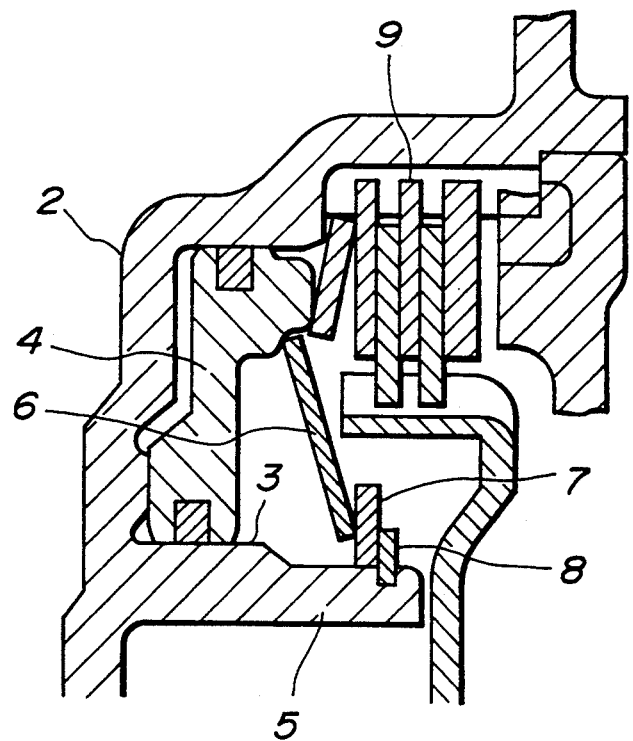
FIG. 3 is a view similar to FIG. 1, showing a known spring retainer.
Figure 4:
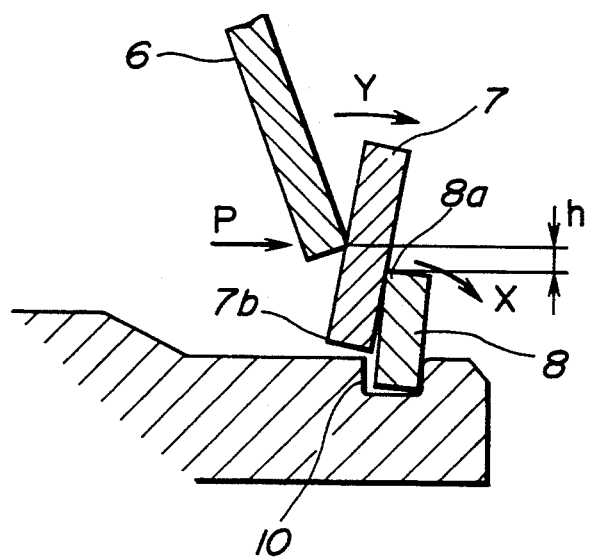
FIG. 4 is a view similar to FIG. 2, showing an operating state of a load in the known spring retainer.

Referring to FIG. 2, there are shown the spring retainer 70 and its mounting site in detail. The spring retainer 70 is made of a plate by a press working, and includes a through portion (first portion) 72 which consists of a hollow cylinder or tube with an inside diameter slightly greater than an outside diameter of the cylindrical shank 40, and a dish bearing portion (second portion) 74 which abuts on the dish spring 60. The dish bearing portion 74 has a sectional shape with a diameter smoothly expanding forward from a front end of the through portion 72 like a horn or bugle, then always expanding but receding like a cone, i.e. a forward swelling form 76 resembling a hollow frustum of a cone and a rearward swelling form which emanates from the base of the forward swelling form 76, and which also resembles a hollow frustum of a cone. The through portion 72 has a rear end 78 which abuts on the snap ring 80. The snap ring groove 42 has a width "b" slightly greater than a thickness of the snap ring 80, and the through portion 72 of the spring retainer 70 has a length "a" greater than the groove width "b". Additionally, there is a clearance D between the dish bearing portion 74 and the snap ring 80.

According to this embodiment, since the dish bearing portion 74 has the forward swelling form 76 with a diameter expanding like a horn, the spring retainer 70 can smoothly be engaged with the cylindrical shank 40 without catching in the snap ring groove 42 upon assembling work. Moreover, since the length "a" of the through portion 72 is greater than the groove width "b" of the snap ring groove 42, the spring retainer 70 fails to be fitted therein.

Further, since the dish bearing portion 74 of the spring retainer 70 fails to contact the snap ring 80 due to a presence of the clearance D, a force from the dish spring 60 is applied to the snap ring 80 only through the rear end 78 of the through portion 72. As a result, the snap ring 80 undergoes a force in the vicinity of its engagement point with the snap ring groove 42, thereby maintaining a bending moment at a low value. Therefore, a gouge and/or a wear on the snap ring 80 and/or the snap ring groove 42 due to tripping fails to occur, preventing a possible omission of the snap ring 80.

Furthermore, since the spring retainer 70 having the through portion 72 and the dish bearing portion 74 is shaped into the forward swelling form 76, a press working of a sheet metal is sufficient to obtain not only a high strength, but an improved reliability.

In the embodiment as described in connection with the drawings, the dish bearing portion 74 has a hornlike expanding portion and a conically expanding portion to thereby define the forward swelling form 76. It is to be noted that the forward swelling form 76 may be obtained otherwise on condition that the front end of the through portion 72 has a diameter expanding smoothly.

What is claimed is:

1. A spring retainer for a piston for use in a hydraulic clutch drum having a shank formed with a groove, a snap ring engaged with the groove and a dish spring, said spring retainer comprising: a first portion having a rear end abutting the snap ring on one side thereof and a forward end, said first portion being in the form of a cylinder which extends from the snap ring along an axial direction of the shank; and a second portion having a first end connected to said forward end of said first portion and a second end which is free, said second portion having a sectional shape with a diameter expanding from said first portion along an axial direction of the shank, said second portion abutting the dish spring and facing the snap ring with a clearance.

2. A spring retainer as claimed in claim 1, wherein said first portion has a length greater than a width of the groove.

3. A spring retainer as claimed in claim 1, wherein said first and second portions are made of a plate.

4. A spring retainer for use in a hydraulic clutch drum having a shank formed with a groove, a snap ring engaged with the groove and a dish spring, said spring retainer comprising:

a tubular portion for engaging said shank, said tubular portion having a rear end for abutting said snap ring and an oppositely disposed forward end;

a first hollow, frusto-conical portion expanding forwardly from said forward end of said tubular portion, said first frusto-conical portion having a base for abutting said dish spring; and a second hollow, frusto-conical portion expanding rearwardly from the base of said first frusto-conical portion, said second frusto-conical portion extending towards said snap ring for a distance which maintains a clearance between said second frusto-conical portion and said snap ring when said tubular portion and said snap ring are engaged on said shank.

5. A spring retainer as claimed in claim 4, wherein said tubular portion has a length greater than a width of said groove.

6. A spring retainer as claimed in claim 4, wherein said tubular and said first and second frusto-conical portions are formed from a single plate.

7. A hydraulic clutch comprising:

a clutch drum having a shank disposed therein and formed with a groove;

a snap ring engaged in said groove;

a clutch piston disposed between an inner surface of said clutch drum and said snap ring;

a dish spring abutting said clutch piston; and a spring retainer disposed between said dish spring and said snap ring, wherein said spring retainer includes:

a tubular portion engaging said shank, said tubular portion having a rear end which abuts said snap ring and an oppositely disposed forward end;

a first hollow, frusto-conical portion expanding forwardly from said forward end of said tubular portion towards said dish spring, a base of said first frusto-conical portion abutting said dish spring; and a second hollow, frusto-conical portion expanding rearwardly from said base of said first frusto-conical portion towards said snap ring, wherein a clearance is defined between said second frusto-conical portion and said snap ring.

8. A hydraulic clutch as claimed in claim 7, wherein said tubular portion has a length greater than a width of said groove.

9. A hydraulic clutch as claimed in claim 7, wherein said tubular and said first and second frusto-conical portions are formed from a single plate.

* * * * *